US 6,707,609 B2

(12) United States Patent
Ryall et al.

(10) Patent No.: US 6,707,609 B2
(45) Date of Patent: Mar. 16, 2004

(54) EXTRINSICALLY ATHERMALIZED OPTICAL FILTER DEVICES

(75) Inventors: Richard J. Ryall, Santa Rosa, CA (US); Charles A. Hulse, Santa Rosa, CA (US); Andrew T. Taylor, Santa Rosa, CA (US); Richard Ian Seddon, Santa Rosa, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 303 days.

(21) Appl. No.: 09/815,916

(22) Filed: Mar. 23, 2001

(65) Prior Publication Data

US 2002/0135912 A1 Sep. 26, 2002

(51) Int. Cl.[7] ................................................ G02B 26/00
(52) U.S. Cl. ........................ 359/578; 359/885; 359/290; 359/900; 359/579; 385/81; 385/79; 385/78
(58) Field of Search .............................. 385/24, 27, 73, 385/80, 79, 81; 359/885–887, 579, 578, 582, 290, 900

(56) References Cited

U.S. PATENT DOCUMENTS

| 4,813,756 | A | 3/1989 | Frenkel et al. |
| 5,375,181 | A | 12/1994 | Miller et al. |
| 5,430,574 | A | 7/1995 | Tehrani |
| 6,269,202 | B1 | 7/2001 | Lee et al. |
| 6,304,383 | B1 | 10/2001 | DeBoynton et al. |

OTHER PUBLICATIONS

Haruo Takashasi, *Temperature Stability of Thin–Film Narrow–Bandpass Filters Produced by Ion–Assisted Deposition,* Applied Optics, vol. 34, No. 4, 667–75 (Feb. 1, 1995).

*Primary Examiner*—Drew Dunn
*Assistant Examiner*—Fayez Assaf

(57) ABSTRACT

A thermally stabilized optical filter device includes a multilayer optical bandpass filter on a transparent substrate, with the transparent substrate being composed of a material having a first coefficient of thermal expansion. An encasement surrounds the transparent substrate such that the bandpass filter is exposed for transmission of predetermined optical wavelengths there through. The encasement is composed of a material having a second coefficient of thermal expansion that is different than the first coefficient of thermal expansion. The encasement provides thermal stability to the optical properties of the bandpass filter by compensating for changes in the filter that occur with temperature variations. In another embodiment, a collet assembly provides means for selectively compressing a filter chip to tune the filter response.

38 Claims, 11 Drawing Sheets

EXTRINSICALLY ATHERMALIZED OPTICAL FILTER DEVICES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. The Field of the Invention

The present invention is related generally to optical filters for use in telecommunications components. More specifically, the present invention is related to optical filter devices that are passively thermally stabilized so as to maintain their optical properties in changing temperature conditions.

2. The Relevant Technology

Many modern optical systems, such as fiber optic systems used in the telecommunications industry, utilize optical narrow bandpass (NBP) filters to achieve wavelength purity. Such optical filters are utilized to multiplex and de-multiplex very narrowly spaced optical channels. Optical bandpass filters typically consist of either Fabry-Perot cavities or multilayer thin film dielectric layers of specific thicknesses that are deposited in the form of an optical coating on a suitable substrate. Both Fabry-Perot cavity filters and thin film optical filters typically change properties, such as transmission loss versus frequency, when subjected to variations in temperature. Some devices might be designed to operate in a temperature-stabilized environment; however, other devices might need to operate over a wide ambient temperature range, such as about −5 to 70° C. Optical components incorporating such filters thereby can exhibit undesirable performance variations. This is a particularly serious problem when the filters are used to perform single wavelength bandpass functions in high channel density optical fiber telecommunications systems such as dense wavelength division multiplexing (DWDM) systems.

The current trend is towards achieving a higher density of information transmission through optical fiber systems, which in turn requires a higher density of channels (and corresponding wavelengths) and also less spacing between channels. Channel spacings are thus being reduced from about 100 GHz to 25 GHz, and therefore when the optical properties of the bandpass filter change with a variation in temperature, the transmitted center wavelength can be shifted, resulting in non-transmitted signals or channels which overlap, causing errors and unreliability in the transmitted information. Such temperature-induced center wavelength shift is a limiting factor in how narrow the optical channels can be spaced and therefore how much information an optical fiber system can carry.

Various attempts have been made to circumvent the temperature stability problem associated with optical bandpass filters. For example, U.S. Pat. No. 5,375,181 by Miller et al. discloses a fiber Fabry-Perot bandpass filter composed of two partially transmissive reflectors separated by an optical cavity of a specific length, which transmits light of a single desired wavelength. Materials for the enclosure of the Fabry-Perot cavity are carefully chosen in cooperation with piezo-electric tuning to compensate for temperature-induced variations in the cavity length. Generally speaking, the filter materials expand with increasing temperature, thus extending the optical path lengths of the layers and shifting the frequency characteristics, such as the passband, to longer wavelengths, or "down spectrum". In some instances, the refractive index of a layer material might also be temperature dependent, thus the optical path length can vary according to both the thermal expansion/contraction and changes in the refractive index. However, incorporating piezoelectric tuning to compensate for temperature variations is relatively complex, and typically requires additional space for the electronic tuning circuitry, and thus may be undesirable for compact fiber optic communication components. Furthermore, the piezo-electric tuning approach requires an electric power source, such as a battery, which can deplete, or line power, which can be interrupted or fail, thus losing the desired tuning.

An approach to enhance the stability of optical filters in optical communication systems is described in U.S. Pat. No. 5,430,574 to Tehrani, in which piezoelectric transducers are used in conjunction with a Fabry-Perot cavity. The piezo-electric transducers are configured in such a way as to effect a change in the length of the cavity in accordance with the magnitude and polarity of control signals. Nevertheless, this approach is also relatively large and complicated to implement in optical communications networks, and is impractical for interference filter applications.

Another approach is described in a paper entitled "Temperature Stability of Thin-Film Narrow-Bandpass Filters Produced by Ion-Assisted Deposition" by Haruo Takashashi, *Applied Optics*, Vol. 34, No. 4, pp. 667–75 (February 1995). In the Takashashi paper, the problems associated with the shift in center wavelength of thin film bandpass filters with changes in temperature and humidity are described. A solution to the problem is proposed by forming the filter on a substrate that has a high coefficient of thermal expansion, which if made properly, can compensate for the changes in the optical properties of the bandpass filter that occur with changes in temperature. The refractive index changes that cause the CWL to increase with increasing temperature can be offset by utilizing a substrate made of a material with a high coefficient of thermal expansion that will stretch the thin film layers as the temperature rises and effectively decrease the physical thickness of the layers. High thermal expansion materials, however, have the disadvantage of being expensive specialized glasses that are difficult to handle and fabricate, as well as easily damaged or downgraded.

Accordingly, there is a need for improved optical filter stabilizing techniques that overcome the above difficulties.

SUMMARY AND OBJECTS OF THE INVENTION

A primary object of the present invention is to provide a device for encasing an optical bandpass filter that provides thermal stability to the optical properties of the filter.

Another object of the present invention is to provide methods for making optical filter devices that exhibit stability with respect to thermal and mechanical stress.

A further object of the present invention is to provide optical filter devices having thermally stabilized center wavelength bandpass characteristics.

To achieve the forgoing objects and in accordance with the invention as embodied and broadly described herein, an optical filter device is provided that includes a multilayer optical bandpass filter on a transparent substrate, with the transparent substrate being composed of a material having a first coefficient of thermal expansion. An encasement holds the transparent substrate such that the bandpass filter is exposed for transmission of optical signals there through. The encasement is composed of a material having a second coefficient of thermal expansion that is different than the first coefficient of thermal expansion. The encasement provides thermal stability to the optical properties of the bandpass filter by compensating for changes in the filter and filter substrate that occur with temperature variations.

Various methods can be utilized to assemble the filter devices of the invention. In one method, an encasement having a high thermal expansion coefficient is shrink fitted to an optical filter such that the substrate of the filter is placed under compression by the encasement in the operating temperature range. In other methods, the filter substrate is bonded above or below the desired operating range, such as with an adhesive, solder, or polymer resin, resulting in stress on the filter substrate that is compressive or tensile. In another embodiment, collet fingers hold the filter. A collet closer is adjusted to provide a selected amount of mechanical stress on the filter, thus providing a selected initial filter characteristic as well as improved thermal stability.

The optical filter devices of the invention are capable of exhibiting stability in their optical properties, such as center wavelength transmission, over a wide temperature range, and are relatively easy and inexpensive to fabricate. Furthermore, the assemblies do not require electronic circuitry or electric power to operate.

These and other aspects and features of the present invention will become more fully apparent from the following description and appended claims, or may be learned by the practice of the invention as set forth hereinafter.

DETAILED DESCRIPTION OF THE INVENTION

1. Introduction

The present invention is directed to apparatus and methods for thermally stabilizing the optical characteristics of thin film multilayer interference bandpass filters. In particular, optical filter devices are provided that are passively thermally stabilized ("extrinsically athermalized") so as to maintain their optical properties in changing temperature conditions. The optical filter devices are particularly useful in optical fiber communication systems that employ dense wavelength division multiplexing (DWDM), which relies on bandpass filters to achieve narrow passband characteristics.

As channel spacings in optical fiber systems are reduced, thermal stability becomes a factor limiting the ability to manufacture simple, reliable optical communication systems. Ideally, DWDM filters should be perfectly centered and have zero thermal shift, which would allow subsystem and component manufacturers to produce appropriate laser emitter units at the lowest cost for a given performance level. However, laser sources for a particular DWDM channel also have an initial wavelength specification tolerance window, as well as thermal and/or aging drift of the output wavelength. Thus, providing a DWDM filter with a more consistent passband allows relaxation of the performance required from optical source lasers.

The present invention improves the operation of optical filters over varying temperatures, which can be a significant source of signal errors and unreliability in optical fiber communication networks. In general, the present invention utilizes an encasement for an optical filter that provides a predetermined stress on the filter that varies with temperature in such a way as to compensate for the change in the optical performance of the filter over varying temperature. This maintains the center wavelength of transmission of the filter within desired limits over a varied temperature range, such as from about minus 5° C. to about +70° C.

2. Shrink-fit Athermalized Filter Assemblies and Methods

Figure 1A:
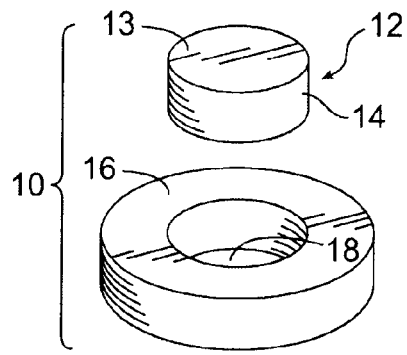
FIG. 1A is a simplified schematic exploded view of an optical filter device according to one embodiment of the present invention.
Figure 1B:
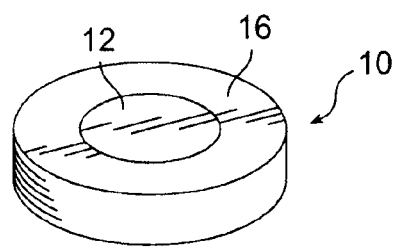
FIG. 1B is a simplified schematic perspective view of the assembled optical filter device of FIG. 1A.

Referring to the drawings, wherein like structures are provided with like reference designations, FIGS. 1A and 1B are schematic depictions of an optical filter device 10 according to one embodiment of the invention. The optical filter device 10 includes an optical bandpass filter 12 such as a multilayer thin film interference filter. Such filters can have a variety of structures and methods of fabrication, which are well known to those skilled in the art, and generally include thin coating layers of dielectric materials that are deposited on a transparent substrate 14. It is understood that "transparent" means that the material passes light at the wavelengths of interest, i.e. in the filter passband, with essentially no transmission loss, and that the material may be opaque at other wavelengths. The bandpass filter 12 is formed to have a substantially circular filter face 13 on a cylindrical substrate 14, as shown in FIG. 1A. It should be understood that the coating layers of filter face 13 can be formed on either or both circular ends of substrate 14 as desired.

A ring-shaped encasement 16 having a circular opening 18 surrounds the side surface of the substrate 14 of the bandpass filter 12, leaving the filter face 13 exposed for transmission of desired optical signals there through. The bandpass filter 12 is fitted into the circular opening 18 of the encasement 16 by various assembling methods, which are discussed in further detail below. The encasement may have other shapes to fit the geometry of a corresponding bandpass filter.

The encasement 16 is composed of a material having certain ranges of coefficients of thermal expansion that compensate for changes in the filter 12 resulting from temperature variations. The encasement 16 can be formed from a material having a thermal coefficient of expansion (coefficient of linear expansion, or "CLE") either higher or lower than the CLE of the material of substrate 14.

As used herein, "low" thermal expansion materials generally include those that have a CLE from about 0–10 ppm/° C., and preferably about 5–10 ppm/° C., at temperatures between about 0–100° C. Suitable materials having a low thermal expansion coefficient include quartz, fused silica, glasses, ceramics, INVAR™ (64 w % Fe, 36 w % Ni), KOVAR™ (54 w % Fe, 29 w % Ni, 17 w % Co), molybdenum, and the like. It is understood that different glasses are available within a range of CLEs, for example, fused silica glass is available with a CLE of about 0.5 ppm/° C. while soda-lime-silica glass has a CLE of about 9–10 ppm/° C. Boro-silicate or boro-silicate crown glasses, such as PYREX™ or SCHOTT BK7™, having a CLE between these values, typically about 3–5 ppm/° C. Generally, the substrate material is optical glass that has been prepared to provide high transmission of optical signals in the wavelengths of interest, such as by de-gassing and annealing the glass.

Materials having a "high" thermal expansion coefficient generally include those that have a CLE in the range from about 10–24 ppm/° C., and preferably from about 15–18 ppm/° C., at temperatures between about 0–100° C. Suitable materials having a high thermal coefficient of expansion include metals such as stainless steels, including types 302, 316 and 430, for example, low alloy steels, including plain steels, aluminum, copper, MONEL™ (66% Ni, 31.5% Cu), and the like.

Figure 1C:
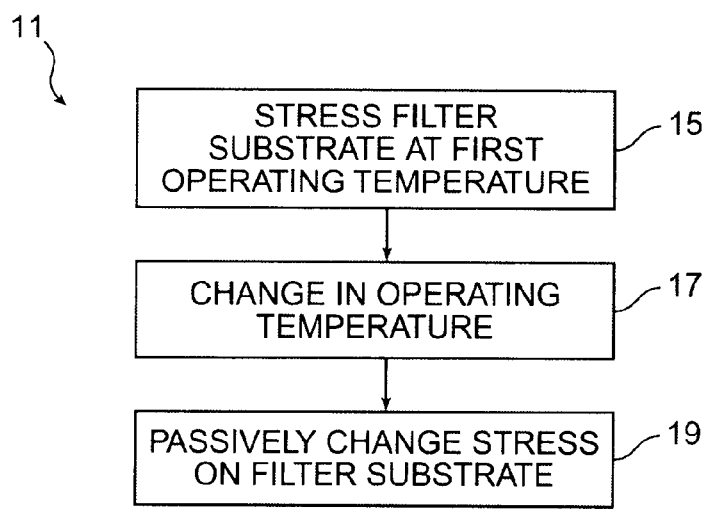
FIG. 1C is a simplified flow chart of a process for athermalizing an optical filter according to an embodiment of the present invention.

FIG. 1C is a simplified flow chart of a process 11 of athermalizing an optical filter assembly according to an embodiment of the present invention. The optical filter assembly includes an optical filter chip having a thin-film filter formed on a substrate in an encasement. The encasement provides a first stress to the substrate of an optical filter at a first operating temperature (step 15). Upon a change in operating temperature (step 17), differential thermal expansion between the encasement and the substrate passively creates a second stress on the substrate (step 19) at the second operating temperature. The term "passively" is used because no external power source (other than the change in temperature) is needed to change the stress, nor is any active control circuitry needed, such as a sensor, feedback control circuit, and actuator. In a preferred embodiment, the first and second stresses are compressive, and the compressive stress decreases with increasing temperature. FIG. 6B provides experimental data corresponding to such passive athermalization.

Figure 2A:
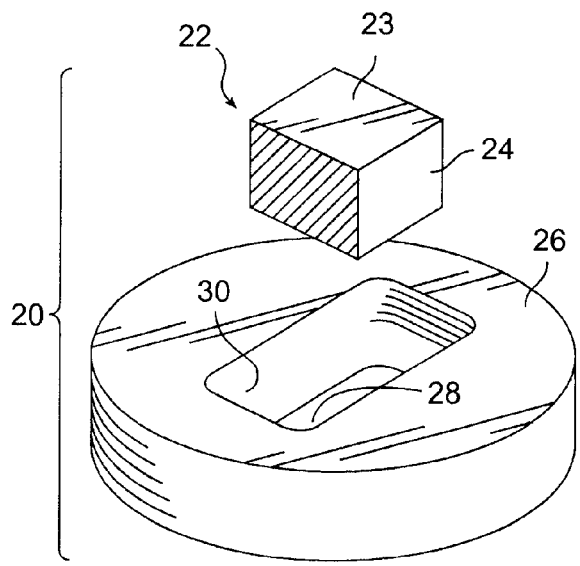
FIG. 2A is a simplified schematic exploded view of an optical filter device according to another embodiment of the present invention.
Figure 2B:
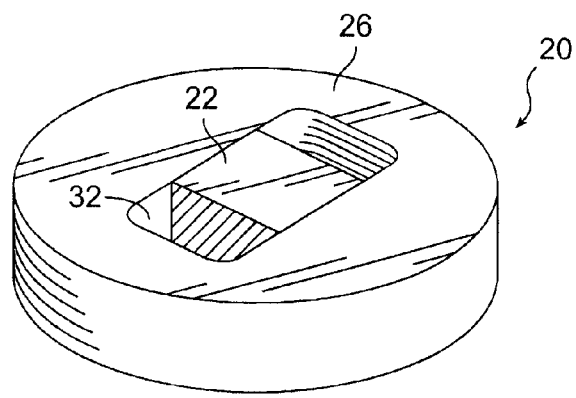
FIG. 2B is a simplified schematic perspective view of the assembled optical filter device of FIG. 2A.

FIGS. 2A and 2B are schematic depictions of an optical filter device 20 according to another embodiment of the invention. The optical filter device 20 includes an optical bandpass filter 22 such as a multilayer thin film interference filter. As shown in FIG. 2A, the bandpass filter 22 is formed to have a substantially rectangular filter face 23 on a rectangular substrate 24. The coating layers of filter face 23 can be formed on either or both rectangular ends of substrate 24 as desired.

A ring-shaped encasement 26 having a rectangular opening 28 is fitted around substrate 14 of bandpass filter 12, leaving filter face 23 exposed for transmission of desired optical wavelengths there through. The rectangular opening 28 is dimensioned so that two opposing sides of substrate 24 can be attached to an inner wall surface 30 of encasement 26, while leaving clearance space 32 for the two other opposing sides of substrate 24, as shown in FIG. 2B. The attachment of filter 22 to encasement 26 can be done with an adhesive, solder, braze, frit (typically ground glass that may contain binders and/or other phases, such as a metal phase), or other similar material, and is discussed in further detail below. An advantage of the rectangular filter and encasement opening is that force can be applied in a single direction, allowing for more control in the compensation of stress on the filter, which in turn changes its optical properties such as the center wavelength transmitted.

The encasement 26 can be formed from a material having either a low or a high CLE, such as the materials discussed above for the encasement 16, which compensate for changes in the filter 22 resulting from temperature variations. In some embodiments, the substrate 24 is composed of a material having a low CLE and the encasement 26 is formed from a material having a high thermal coefficient of expansion. In other embodiments, the substrate is composed of a material having a high CLE and the encasement is formed from a material having a low CLE. In yet other embodiments, both the substrate and the encasement is formed from a low CLE material or a high CLE material, with the materials selected according to their difference in CLE to achieve a desired filter tuning and/or thermal stabilization effect.

Various methods for assembling the optical filter devices of the invention, which are thermally stable with respect to center wavelength transmission, are described below. In one assembly method of the invention, an encasement such as a circular ring having a high thermal expansion coefficient is selected. A compression fit is employed to encase a round optical filter such that the substrate of the filter is placed under compression by the encasement in the temperature range of interest. This can be accomplished by heating the encasement material and/or cooling the substrate to effect a "shrink fit" of the filter in the encasement. The stress on the substrate is compressive and would relax with an increase in temperature during use of the optical filter device in an operating system.

Figure 3A:
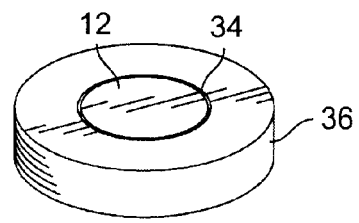
FIG. 3A is a simplified perspective view of a pre-assembly of a filter and encasement.
Figure 3B:
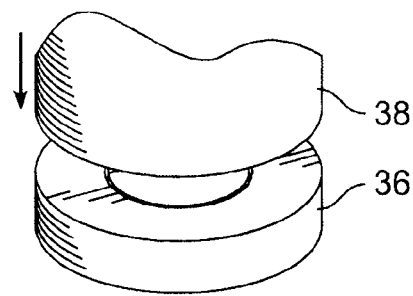
FIG. 3B is a simplified perspective view illustrating conforming the encasement to a zero clearance condition with the filter chip by stamping.

FIGS. 3A–3D are simplified perspective views illustrating assembly processes of athermalized optical filters according to embodiments of the present invention. A filter chip 12 has an outside diameter slightly smaller, e.g. 1–3 mils (0.03–0.08 mm) than the inside diameter 34 of the encasement 36, thus allowing the die to fit inside the encasement, as shown in FIG. 3A. In FIG. 3B, a hollow tool 38 stamps the encasement 36 against an anvil (not shown) to deform the encasement and bring the inside diameter of the encasement in intimate contact with the outside diameter of the filter chip, and to apply initial compressive stress to the filter chip. The stamping operation is done in one step, or in multiple steps. For example, stamping could be done until a zero clearance condition exists between the filter chip and the encasement, and then proceed to provide a selected amount of compressive stress. Alternatively, stamping is done at an elevated temperature, e.g. above 100° C., to a zero-clearance condition, and then the assembly is cooled to shrink the encasement around the filter chip to apply compressive stress. Thus, the process accommodates small variations in the respective and relative critical diameters.

Figure 3C:
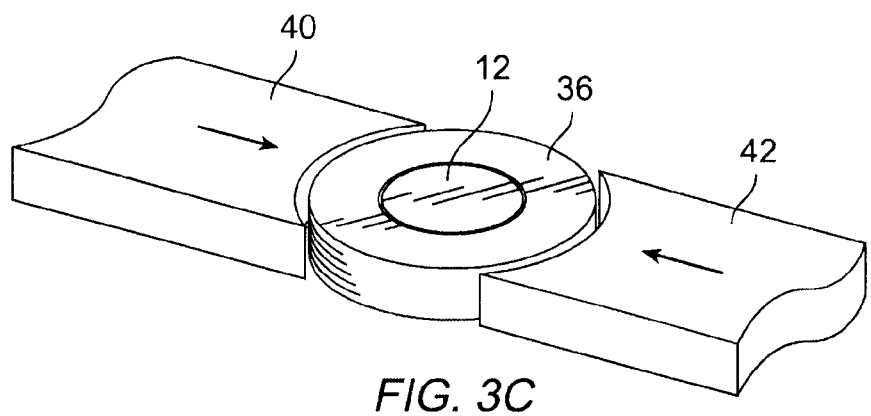
FIG. 3C is a simplified perspective view illustrating conforming the encasement to a zero clearance condition with the filter chip by swaging.
Figure 3D:
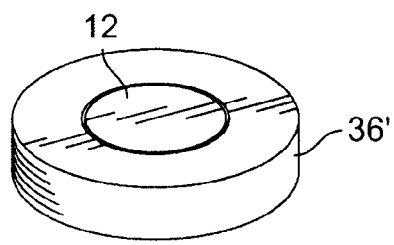
FIG. 3D is a simplified perspective view of an encased filter assembly.

FIG. 3C is a simplified perspective view of an alternate way to deform the encasement around the filter chip. Swaging presses 40, 42 compress the encasement 36 around the die 12 at an elevated temperature until a zero-clearance condition is achieved, and then the assembly is cooled to shrink the encasement around the filter chip. FIG. 3D shows a completed filter assembly with the formed encasement 36' providing compressive stress to the filter chip, as obtained by stamping or swaging, for example.

In yet another embodiment of the present invention, the encasement is made of "memory metal", such as nickel-titanium shape memory alloy. The encasement is made with an opening slightly smaller than the width of the filter chip. The opening is enlarged, such as with a mandrel and press, to allow assembly of the filter chip into the encasement. Then, the encasement is processed to trigger the memory process and shrink the encasement around the filter chip.

Figure 3E:
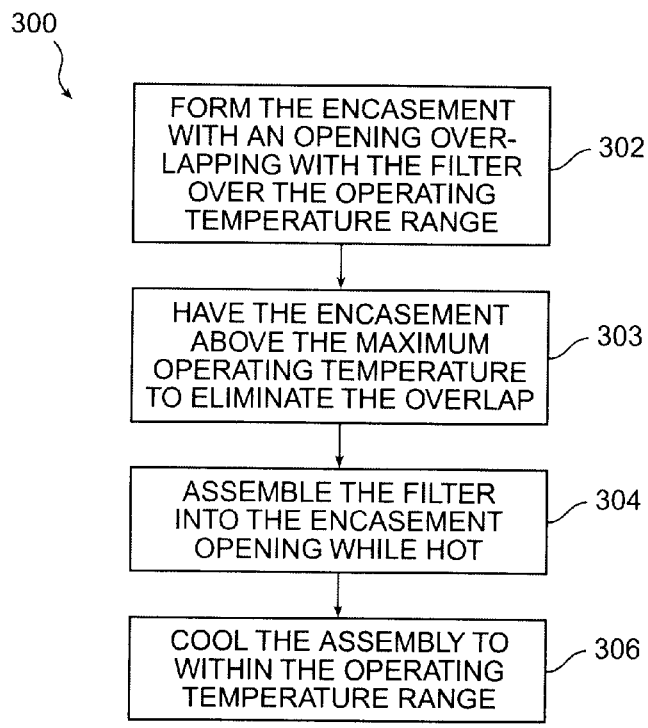
FIGS. 3E and 3F are simplified flow charts of processes according to the present invention.

FIG. 3E is a simplified flow chart of an assembly process 300 according to an embodiment of the present invention. A ring encasement is formed, e.g. from a metal with a high CLE, with an opening that is smaller than the width of a filter at room temperature (step 302), e.g. the diameter of a cylindrical filter or the side-to-side distance of a rectangular filter. The ring is heated (e.g., >100° C.) (step 303) until it is large enough to slip over the filter (step 304), and the assembly is cooled (step 306) to shrink the encasement around the filter and provide compressive stress to the filter substrate. The process may be applied to round or rectangular filter chips, as described above in relation to FIGS. 1A–2B.

Figure 3F:
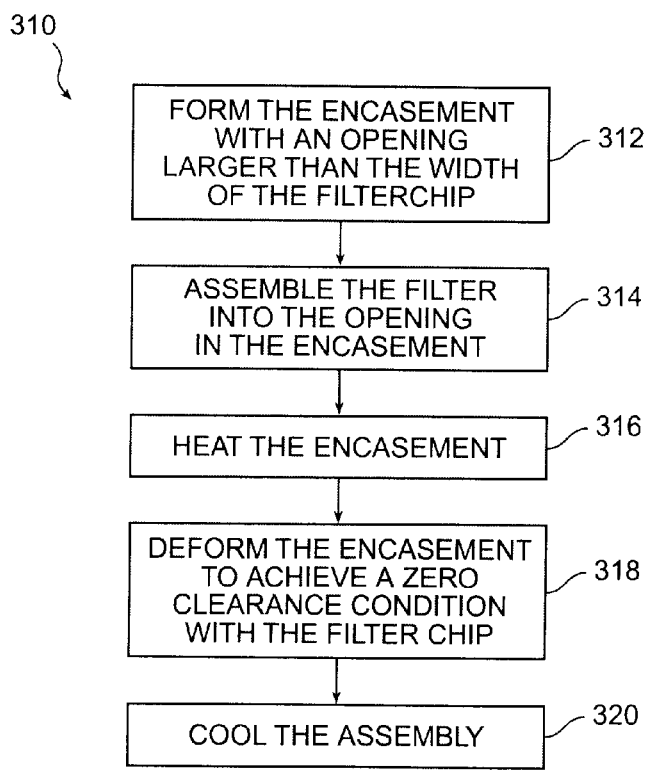

FIG. 3F is a simplified flow chart of an assembly process 310 according to another embodiment of the present invention. A metal ring encasement is formed with a cylindrical opening that is slightly larger than the diameter of a cylindrical filter (step 312). The filter is placed in the encasement (step 314) and at least the encasement is heated to above the highest expected operating temperature of the athermalized filter assembly (step 316). The encasement is deformed to create a zero-clearance condition with the filter (step 318) and the filter-encasement assembly is cooled to below the highest expected operating temperature (step 320) to provide compressive stress to the filter substrate.

When the ring cools, it pre-stresses the filter and adds another temperature-dependent stress to the filter. The filter is athermalized because the compressive stress applied by the encasement decreases as the filter substrate expands with an increase in temperature. The expanding filter substrate "stretches" the thin film filter stack as the temperature is increased, thus "thinning" the layers of the filter stack to counteract the expanding thicknesses of the thin film layers. The thickening of the thin film layers generally operates to increase the center wavelength of the thin film stack.

The action provided by the expanding substrate can be enhanced ("amplified") by the relaxation of the compressive stress with increasing temperature. A relaxation of the stress occurs due to the more rapidly increasing internal diameter of the encasement (compared to the outside diameter of the filter) to more strongly counteract the change in layer thicknesses.

The amount of prestress can be controlled according to the designed overlap between the outer diameter of the filter chip and the inner diameter of the encasement, in light of the compressive and tensile strengths of the filter substrate and encasement materials. Similarly, the encasement and substrate materials can be chosen according to their CLEs to achieve the desired athermalization. For example, an optical glass with a relatively low CLE, such as SCHOTT BK7™, might be used in one type of assembly, while an optical glass with a higher CLE, such as SCHOTT F7™, might be used in another type of assembly, according to the encasement material, design overlap, and prestress level.

In practice, the filters and encasements are usually small (<3 mm) in size and only expand a few microns over a several hundred-degree C temperature change, so a sub-micron size tolerance is required for both the outside dimension of the filter and the mating inside dimension of the encasement. Also, because the filter is often coated on a brittle material, such as optical glass, there is an equivalently stringent requirement that the shape of both the filter and the opening in the encasement be similar to differences of less than a micron in order to avoid point contacts and high stress loading, which could lead to catastrophic failure of the filter substrate. In cases where an initial compressive stress is applied by an encasement, the amount of stress is reduced in a controllable manner by removing material from the encasement, typically the outer perimeter, thus reducing the strength of the encasement.

Another parameter that has been found to affect the thermal performance of the filter is how far the coated surface (filter surface) of the filter chip extends beyond the encasement. Assembling the filter chip in the encasement so that the coated surface extended about 0.5 mm beyond the surface of the encasement resulted in more CWL shift over a given temperature range compared to a similar filter chip mounted so that the coated surface was flush with the surface of the encasement. In this way, the thermal sensitivity of the filter assembly can be controlled by selecting how far the coated surface of the filter chip extends beyond the encasement.

3. Bonded Athermalized Filter Assemblies

Figure 4A:
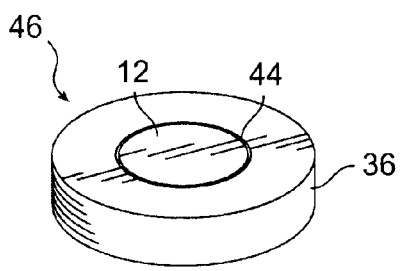
FIG. 4A is a simplified perspective view of a filter chip bonded in an encasement.

FIG. 4A is a simplified perspective view of another embodiment of the invention using a bonding layer 44 between the filter chip 12 and the encasement 36. The bonding material transitions from a liquid state to a solid state during the bonding process. Although this embodiment is illustrated with a circular filter and encasement opening 46, rectangular or other geometry filter assemblies are also possible. In this example, an encasement material having a high thermal expansion coefficient is selected, and the filter is bonded into the encasement 36 at a temperature above the desired operating temperature range of filter assembly, which is typically about −5° C. to 70° C., such that the encasement compresses the filter when cooled to room temperature.

The bond material serves two purposes: it creates a zero clearance condition at the assembly temperature between a filter and encasement manufactured to relatively wide tolerances, and it acts as a buffer material to distribute stress loads between the perimeter of the filter and the inner surface of the encasement. Bonding can be accomplished by use of an adhesive, such as a thermoplastic or thermosetting resin, solder, braze, frit, which may include several phases, such as a metal phase(s) or a ceramic phase(s), in addition to the glass phase(s), or the like.

The zero clearance condition occurs when the bonding material is liquid, allowing the magnitude of the shrink fit to be altered by changing the assembly (bonding) temperature, which affects the diameters of the filter substrate and encasement. In some instances the bonding material is applied as a liquid, such as a liquid resin or solder and solidified by cooling (phase transition), polymer linking, or other mechanism. In other instances the bonding material is applied as a powdered solid or slurry, such as frit with a liquid carrier or a braze-flux or solder-flux compound. In some embodiments, the bonding material is applied between the filter substrate and encasement at room temperature, and then the entire assembly is heated (generally above the highest desired operating temperature) to melt the bonding material, and then the assembly is cooled, the bonding material generally solidifying above the highest desired operating temperature.

When the assembly temperature is above the desired operating temperature and the encasement material has a relatively high CLE, the stress on the substrate is compressive, and would relax with an increase in temperature. This method does not require the stringent manufacturing tolerances of the assembly methods described in conjunction with FIGS. 1A, 1B, 2A, and 2B, above.

Alternatively, the filter may be bonded into an encasement having a high thermal expansion coefficient at a temperature below the desired operating temperature range of about −5° C. to 70° C. The bonding may be accomplished through the use of an adhesive, such as a thermoplastic or thermosetting resin, solder, braze, frit, or the like. The stress on the substrate would be tensile, and would increase with an increase in temperature. In the case of the bonding material not being liquid below the desired operating range of athermalized filter assembly, localized heating of the bonding material and/or contact surfaces may be used, with or without the addition of active cooling of other portions of the assembly.

In another embodiment, an encasement material having a low CLE is selected, and a filter is bonded into the encasement at a temperature above the desired operating temperature range of about −5° C. to 70° C. The bonding may be accomplished through the use of an adhesive, solder, braze, frit, or the like. The stress on the substrate is tensile, and would increase with an increase in temperature.

In yet another embodiment, the encasement material is formed around the filter chip in a liquid state, thus creating a zero clearance condition, and solidified. For example, molten metal could be formed around a filter chip and cooled, which creates compressive stress as the high CLE encasement cools from the liquid-solid transition temperature.

When a square or rectangular filter is bonded to an encasement on two opposing sides, such as shown in the embodiment of FIG. 2B, some additional advantages are realized. The force is applied in a single direction on the filter, which may control sensitivity to stress-induced compensation, for example, reducing the stress applied by the encasement required to achieve a desired effect, for example. It can also be beneficial to apply stress in a particular direction, such as relative to runoff on the filter.

It should be noted that the stress direction (i.e., compressive or tensile) for any of the above assembly methods for the optical filter device may be reversed by utilizing a low thermal expansion coefficient material to encase the filter.

By attaching an optical filter to an encasement incorporating a significantly different coefficient of thermal expansion, it is possible to achieve passive thermal performance stability similar to that achieved with high expansion filter substrates (e.g. substrates made from glass with a CLE between about 3–8 ppm/° C.) while utilizing filter substrates of lower expansion (e.g. less than about 3 ppm/° C.), thus providing ease of handling and fabrication, and therefore significantly increasing cost effectiveness. Alternatively, a high expansion substrate can be combined with an encasement to achieve a higher degree of passive athermalization.

Figure 4B:
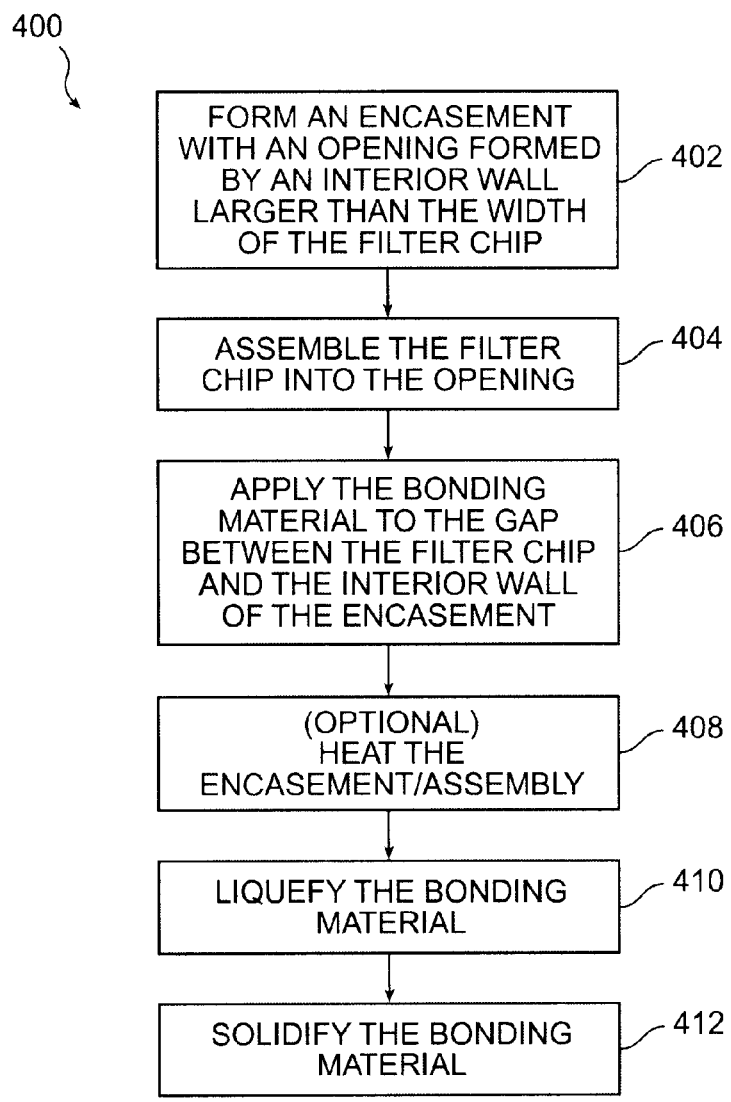
FIG. 4B is a simplified flow chart of a process of bonding a filter in an encasement according to another embodiment of the present invention.

FIG. 4B is a simplified flow chart of a process 400 of assembling an athermalized filter assembly according to an embodiment of the present invention. An encasement is formed with an interior hole slightly larger than a width of a corresponding filter chip substrate (step 402). The filter chip is assembled in the interior hole of the encasement (step 404) and bonding material is applied to the gap between the filter chip and the encasement in the interior hole (step 406). Optionally, the encasement is heated (step 408). Before, during, or after the bonding material is applied to the gap, the bonding material is liquefied (step 410). The bonding material is solidified (step 412). It is understood that the order of the liquification step is not limited in time other than that at some point the bonding material between the filter substrate and encasement is a liquid, and that it subsequently solidifies.

4. Collet Optical Filter Tuning and Athermalizing Assemblies

Figure 5A:
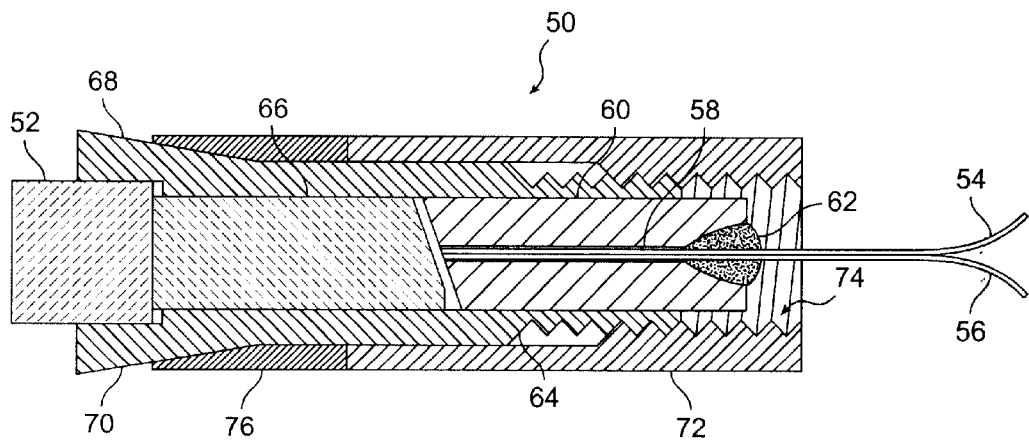
FIGS. 5A–5H are simplified cross sections of tunable athermalized collet-filter assemblies.

FIG. 5A is a simplified cross section of a collet 50 holding an optical filter chip 52. Optical fibers 54, 56 are held in a capillary 58 of a ferrule 60 with a drop of adhesive 62, such as an epoxy adhesive. For purposes of discussion in this instance, the combination of the optical fibers and ferrule are referred to as a "pigtail".

The collet includes an interior sleeve 64 holding the angle-lapped ferrule 60 relative to a collimation lens 66, such as a gradient refractive index ("GRIN") lens. The collimation lens is in turn optically coupled to the filter chip 52, which includes a thin-film optical filter formed on an optical substrate. The thin-film optical filter may be on either surface of the filter chip that the light beam from the collimation lens passes through, but is typically on the surface proximate to the collimation lens. Additional coatings, such as an anti-reflective coating and/or another filter stack, can be present on the opposite face. Typically, optical signals arriving on one fiber are expanded into a light beam by the collimation lens to be filtered. The filter typically transmits selected wavelengths and reflects the other wavelengths back into the collimation lens, which focuses the reflected beam onto the end of the other optical fiber.

Fingers 68, 70 (only a few of which are shown) extending from the inner sleeve 64 hold the filter chip 52. A barrel 72 has interior threads 74 that mate with threads on the inner sleeve. A collet ring 76 presses the fingers together when the barrel is rotated with respect to the sleeve to push the collet ring toward the filter chip end of the assembly, thus closing the collet and applying compressive stress to the filter chip. When the barrel is rotated the other way, the collet ring retracts and spring forces open the fingers. The compressive stress placed on the filter chip can be controlled by tightening or loosening the collet fingers. This stress can be used to tune the filter characteristic as well as to athermalize the collet-filter assembly.

Figure 5B:
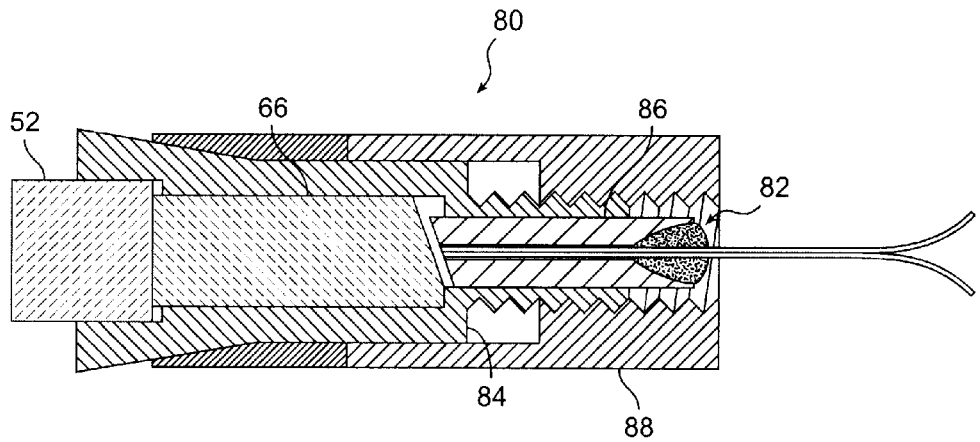

FIG. 5B is a simplified cross section of a collet-filter assembly 80 according to another embodiment of the present invention. A pigtail 82 having a substantially smaller diameter than the collimation lens 66 is held in a stepped inner sleeve 84. For example, where the collimation lens has an outside diameter of about 2 mm and the ferrule 86 has an outside diameter of about 1 mm. A first inner diameter is configured to accept the collimation lens, and a second inner diameter is configured to accept the pigtail. The pigtail and collimation lens can be press-fit and/or glued into the inner sleeves, for example. Similarly, after the desired amount of compressive stress is achieved, the inner sleeve and barrel 88 can be bonded together with a drop of epoxy or thermoplastic resin, for example. When designing the collet, it is desirable to have the collet taper angle be somewhat greater than the wedge angle, which is a property of the combination of collet and collet closer materials and is related to the coefficient of friction between them. A taper angle equal to or below the wedge angle will cause the taper to become self-locking, in which case the collet will ratchet up during temperature cycling, increasing the applied stress over time.

Figure 5C:
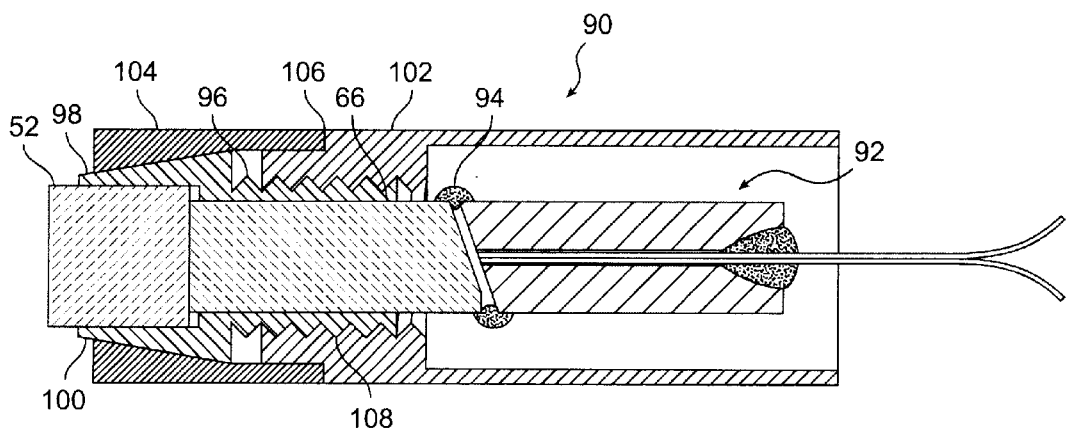

FIG. 5C is a simplified cross section of a collet-filter assembly 90 according to another embodiment of the present invention. The pigtail 92 is attached to the collimation lens 66 with a ring of adhesive 94, such as epoxy resin. The inner sleeve 96 has tapered fingers 98, 100 and holds the collimation lens 66. The barrel 102 and collet ring 104 are bonded together at a joining interface 106 so that turning the barrel, which is coupled to the sleeve through screw threads 108 closes the fingers on the filter chip 52 by pulling the collet ring away from the filter end of the assembly.

Figure 5D:
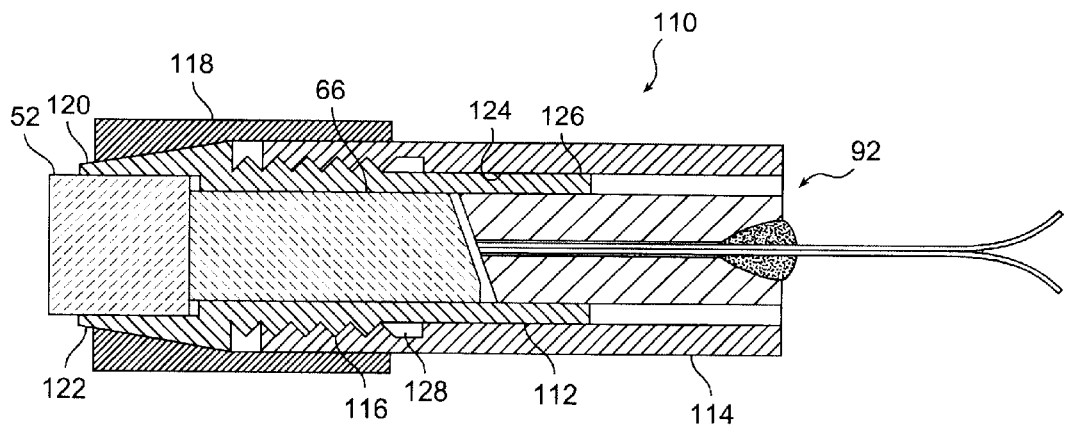

FIG. 5D is a simplified cross section of a collet-filter assembly 110 according to another embodiment of the present invention. The pigtail 92 is coupled to the collimation lens 66 with an inner sleeve 112 that is coupled to the barrel 114 with threads 116. A collet ring 118 is bonded to the barrel and tightens the fingers 120, 122 around the filter chip 52 when the barrel is rotated relative to the inner sleeve. The surfaces of the inner sleeve and barrel distal from the fingers form a journal 124 and bearing 126 to support the inner sleeve. A recess 128 is provided for the screw threads on the barrel.

Figure 5E:
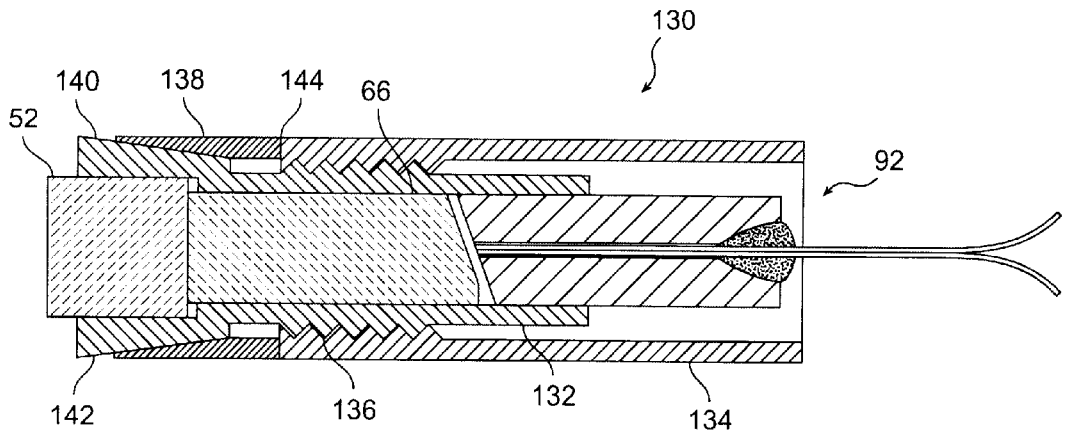

FIG. 5E is a simplified cross section of a collet-filter assembly 130 according to another embodiment of the present invention. An inner sleeve 132 couples the pigtail 92 to the collimation lens 66, and is coupled to the barrel 134 with screw threads 136. The collet ring 138 is held in place between wedge fingers 140, 142 and the shoulder 144 of the barrel, thus captivating the collet ring.

Figure 5F:
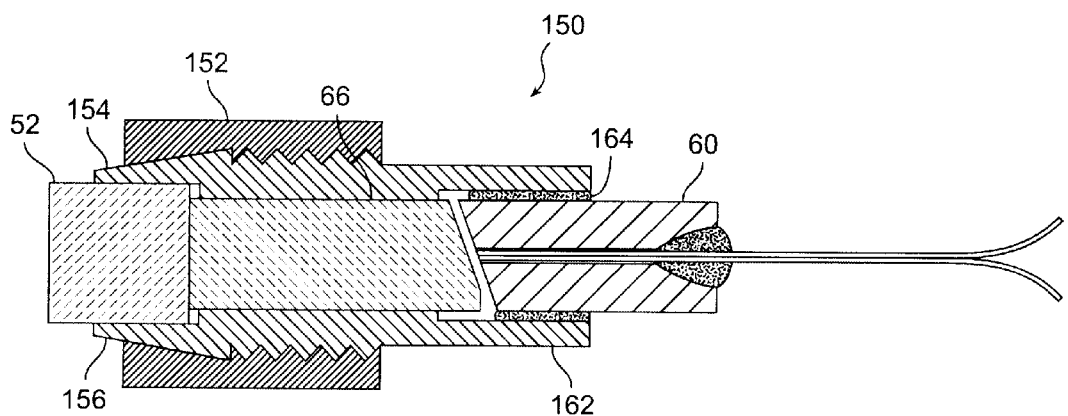

FIG. 5F is a simplified cross section of a collet-filter assembly 150 in which the barrel 152 compresses the fingers 154, 156 onto the filter chip 52 without a separate collet ring piece. Both the collimation lens 66 and the ferrule 60 have nominally the same diameter, for example 2 mm or 1 mm, but could have different diameters. The collimation lens 66 is press-fit into the sleeve 162 and the ferrule 60 is bonded in the sleeve with an adhesive 164 such as epoxy resin.

Figure 5G:
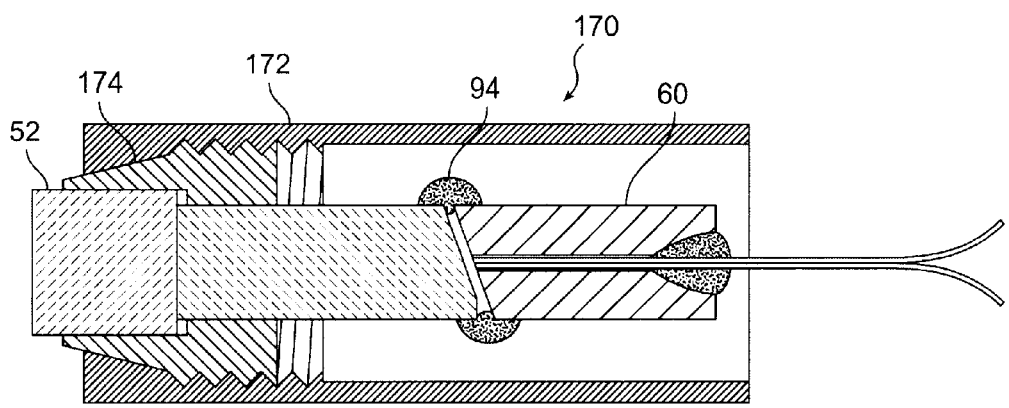

FIG. 5G is a simplified cross section of a collet-filter assembly 170 wherein the ferrule 60 is bonded to the collimation lens 66 with a ring of adhesive 94, such as epoxy resin. This embodiment uses a barrel 172 and a sleeve 174 without a collet ring. The collimation lens 66 extends from the sleeve 174 so that the ferrule 60 can be bonded to it.

Figure 5H:
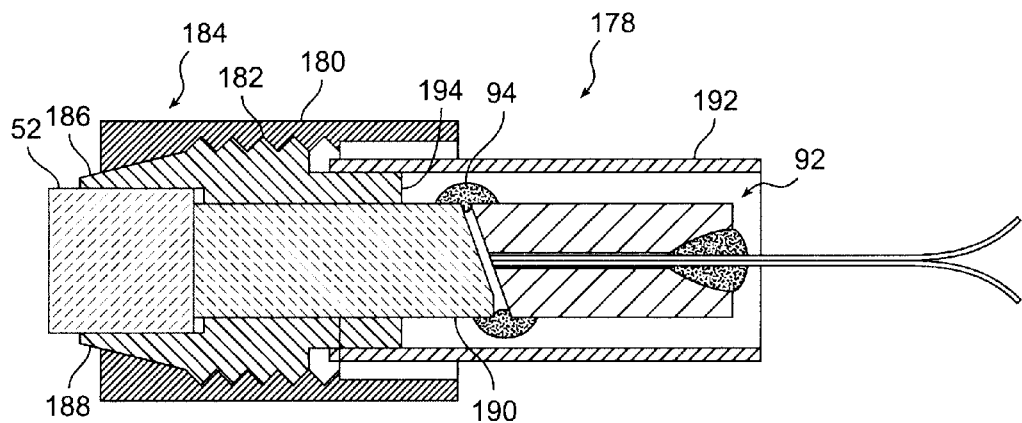

FIG. 5H is a simplified cross section of a collet-filter assembly 178 according to another embodiment of the present invention. A stub barrel 180 is coupled to the sleeve 182 with screw threads. A wedge portion 184 of the barrel acts on the tapered fingers 186, 188 to adjust the amount of compression the fingers apply to the filter chip 52. The collimation lens 66 is press-fit into the sleeve, and the pigtail 92 is coupled to the collimation lens at an extending portion 190 of the collimation lens with a ring of adhesive 94. A cover 192 is press-fit to a distal portion 194 of the sleeve to provide mechanical protection to the final assembly. The cover is applied after the pigtail is assembled to the collimation lens, thus allowing access to the entire perimeter of the collimation lens-pigtail joint, and is not required in all applications.

In an alternative embodiment, a collet closer, such as a collet ring, is assembled over collet fingers holding a filter chip in assembly tooling. Force is applied between the collet closer and collet fingers to achieve a selected amount of compressive stress (CWL shift and/or athermalization). Then, the collet closer is bonded to the collet fingers, thus avoiding forming screw threads on individual filter assemblies. Rather, an assembly tool uses compressive force, such as from a jack screw or hydraulic piston, to press the collet closer onto the fingers. The fingers may be tapered or wedge-shaped, with a collet closer being applied from the front (filter) side or back (optical fiber) side of the assembly, respectively.

Figure 5I:
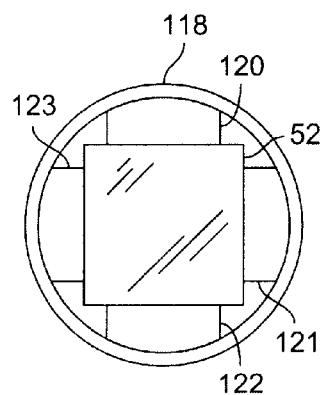
FIG. 5I is a simplified end view of a filter chip held in a collet.

FIG. 5I is a simplified end view of the collet-filter assembly shown in FIG. 5D, for example, showing the filter chip 52 fingers 120, 121, 122, 123 and collet ring 118 More or fewer fingers could be used, and the fingers could be adapted to accommodate other filter shapes, such as a round or rectangular shape. Specifically, two fingers could be used to apply stress to the filter along a particular direction, such as along a runoff direction.

Figure 5J:
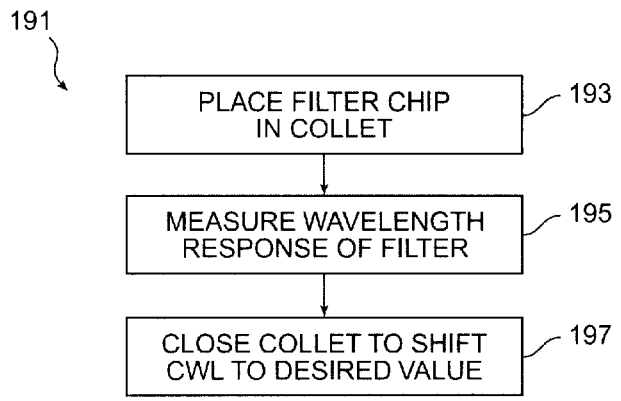
FIG. 5J is a simplified flow chart of a method for tuning an optical filter according to another embodiment of the present invention.

FIG. 5J is a simplified flow chart of a process 191 of tuning a thin-film optical bandpass filter according to an embodiment of the present invention. In this embodiment, the encasement is formed by collet fingers acting in cooperation with a collet closer to apply a selected amount of compressive stress on the filter substrate. The process may be performed at room temperature, or at higher or lower temperatures, according to the desired initial condition. An optical filter chip is place in the collet fingers (step 193) and the response of the filter is measured (step 195). The measurement can be transmissive, reflective, or both, and is typically done with an optical spectrum analyzer sweeping over the wavelengths of interest. The collet closer is adjusted to apply a selected amount of stress to the filter chip (step 197), which typically shifts the wavelength response upscale. The compressive stress can also athermalize the filter assembly because the collet fingers and collet closer have a different, usually greater, CLE than the filter substrate.

Figure 5K:
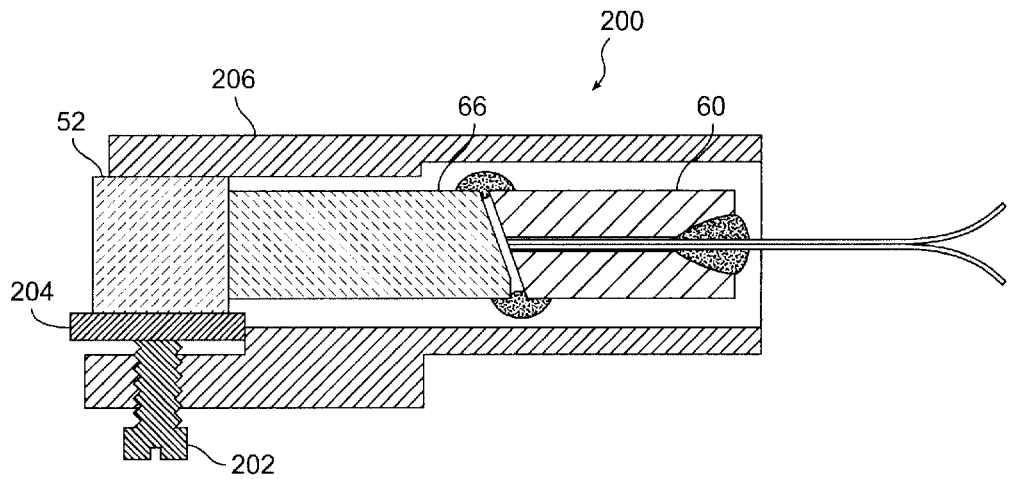
FIG. 5K is a simplified cross section of a tunable filter assembly using a screw.
Figure 5L:
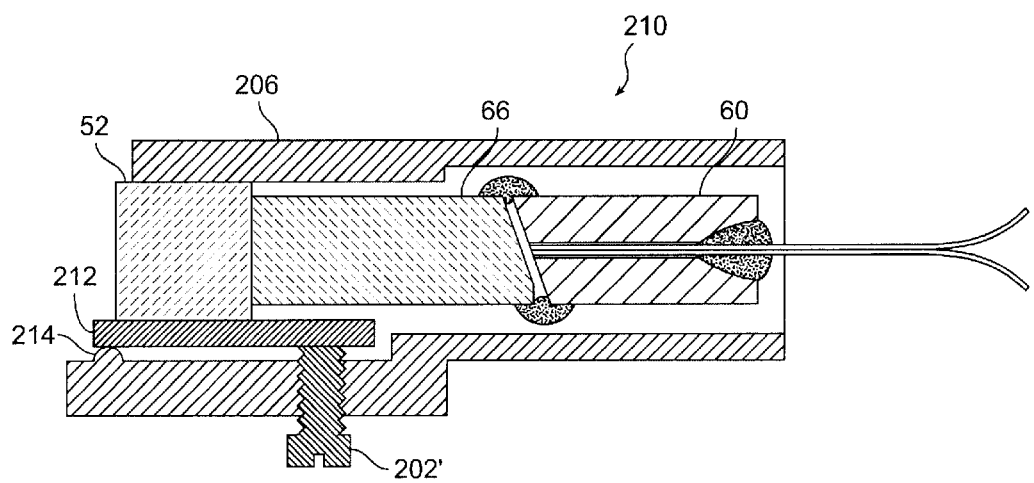
FIG. 5L is a simplified cross section of a tunable filter assembly using a screw in combination with a lever.

FIG. 5K is a simplified cross section of a filter assembly 200 with stress applied to the filter chip 52 with a screw 202. The collimating lens 66 and ferrule 60 can be fabricated into the filter assembly using any of several methods. The screw can be tightened to apply force against an anvil 204, which transfers the applied force to compress the filter chip held in the barrel 206. After assembly, the screw can be locked in place with a thread adhesive. Many arrangements using screws to apply force to the filter chip may be used. FIG. 5L is a simplified cross section of a filter assembly 210 using a lever 212 rotating about a fulcrum 214 or hinge in combination with a screw 202'. The lever decreases sensitivity of the filter chip tuning in relation to the angle the screw is turned through, and also resists thread stripping, compared to the direct screw-anvil assembly of FIG. 5K. Alternative lever-screw arrangements can be used, as well as compound levers, levers arranged in a scissors fashion, and rack-and pinion screws, to name a few.

5. Experimental Results

Figure 6A:
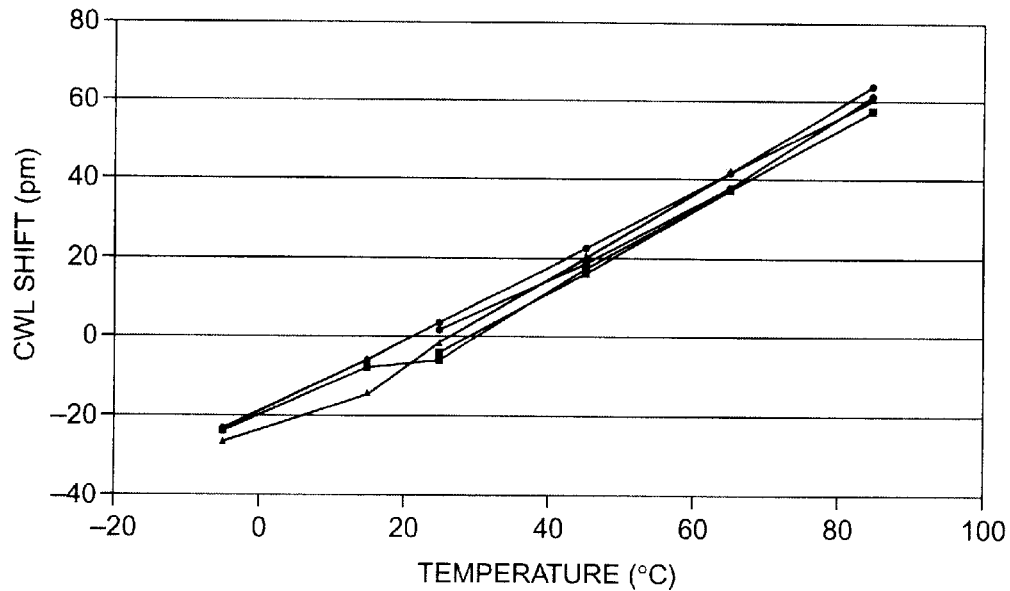
FIG. 6A is a graph showing the shift in center wavelength for as-fabricated thin-film filters versus temperature.
Figure 6B:
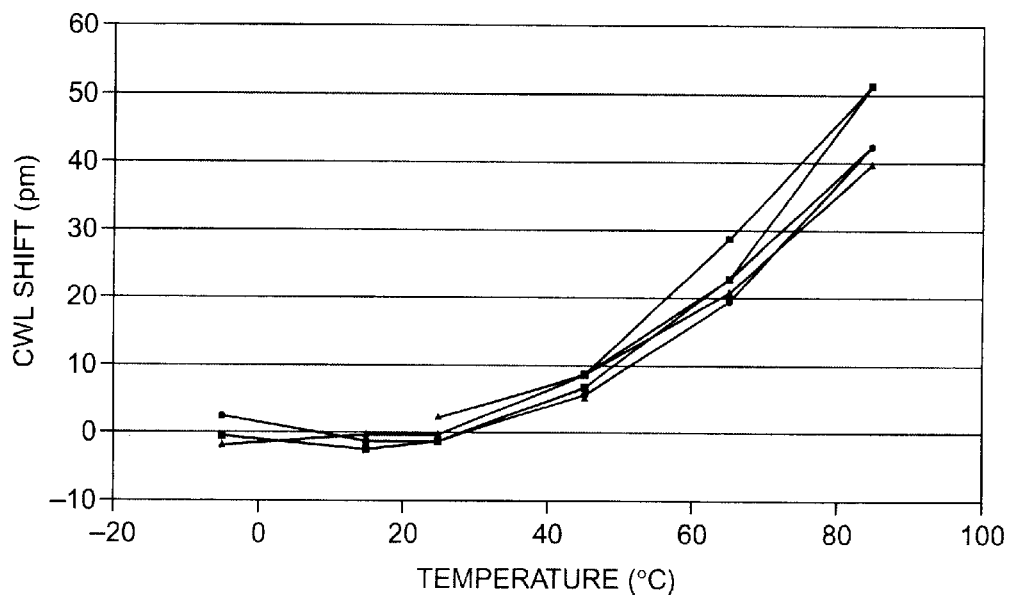
FIG. 6B is graph showing the shift in center wavelength for the filters illustrated in FIG. 6A after assembly in stainless steel ring encasements.

FIG. 6A is a graph showing the shift in center wavelength (CWL) in picometers ("pm") for as-fabricated circular thin film filters versus temperature. The filters were fabricated on a glass substrate having a CLE of about 10 ppm/° C., and had a thickness and a diameter each equal to about 1.5 mm. The nominal test wavelengths were around 1550 nm. The filter samples were taken from a single coating run. The CWL shift is essentially linear from about −5 to 85° C.

FIG. 6B, in comparison, shows the CWL shift versus temperature for the same filters over the same temperature range after the filters were assembled in 3 mm type 303 stainless steel ring encasements. The CWL shift is much flatter between about −5 to 45° C., and whereas the CWL shifts for unencased filters range from about −30 to about 60, CWL shifts for encased ring filters range from about −4 to about 45 or 50 over the same temperature range. Thus, the ring filters show improved CWL temperature stability. However, the application of compressive stress typically shifts the room-temperature CWL upscale.

Figure 6C:
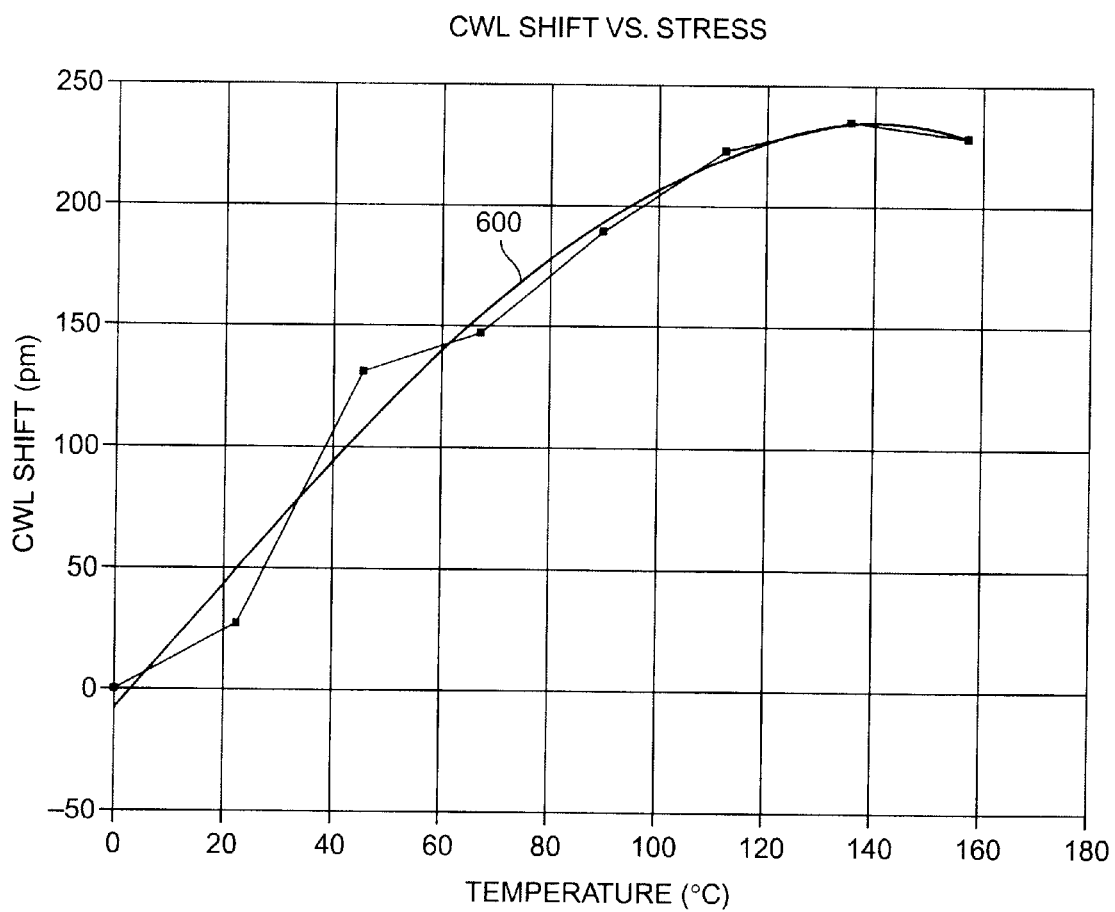
FIG. 6C is a graph of the shift in center wavelength versus torque screw angle of a collet-filter assembly.

FIG. 6C is a graph of the CWL shift versus jack screw angle of a collet-filter assembly. The curve 600 is a third-order fit to the data points. The jack screw had a pitch of 40 threads/inch and measurements were made at room temperature. The jack screw angle is the amount the screw was turned to jack up one end of a center-hinged lever, thus applying force to the filter clamped under the opposite end. The angle is assumed to be generally proportional to the amount of compressive force applied to the filter. This graph illustrates that thin-film filters can be tuned over about 230 pm upscale by the application of a selected compressive stress. Thus, not only can thin-film optical filters be thermally compensated by the application of stress, they can also be tuned at room temperature by the application of a selected amount of stress. Such tuning can increase yields from a filter coating run by adjusting the CWL of out-of-specification as-fabricated filters to meet the CWL specification as a encased filter and/or narrow the CWL specification window to allow greater variance in other system components.

The optical filter devices of the invention are particularly useful in applications where interference filters are required to provide nearly constant optical performance over a temperature range, such as the ambient temperature range specified for some telecommunications components utilizing dense wavelength division multiplexing filters. The optical filter devices are also useful in situations where application of an external temperature-dependent stress effect would prove beneficial, such as in the case where it is desired to intentionally reverse the natural direction or change the rate of optical performance shift with temperature.

In addition, the optical filter devices of the invention exhibit stability with respect to thermal and mechanical stress, and have thermally stabilized center wavelength bandpass characteristics over a wide temperature range.

The present invention may be embodied in other specific forms without departing from its spirit or essential characteristics. The described embodiments are to be considered in all respects only as illustrative and not restrictive. The scope of the invention is, therefore, indicated by the appended claims rather than by the forgoing description. All changes which come within the meaning and range of equivalency of the claims are to be embraced within their scope.

What is claimed and desired to be secured by United States Letters Patent is:

1. An optical filter device comprising:
   an optical filter having a wavelength characteristic, the optical filter being formed on a substrate composed of a first material having a first selected coefficient of thermal expansion and having a filter face essentially perpendicular to a side of the substrate;
   an encasement providing a temperature-varying force to the side of the substrate in a plane essentially parallel to the filter face such that the optical filter is exposed for transmission of predetermined optical wavelengths there through, the encasement being composed of a second material having a second selected coefficient of thermal expansion that is different than the first selected coefficient of thermal expansion, the second selected coefficient of thermal expansion being selected to provide a temperature-varying stress to the side of the substrate in the plane essentially parallel to the filter face within an operating temperature range of the optical filter device to compensate for thermal shifts in the wavelength characteristic of the optical filter.

2. The optical filter device of claim 1, wherein the optical filter has a substantially circular filter face and the transparent substrate is substantially cylindrical.

3. The optical filter device of claim 1, wherein the encasement is ring-shaped and configured so as to substantially contact a side surface of the transparent substrate.

4. The optical filter device of claim 1, wherein the bandpass filter has a substantially rectangular filter face and the transparent substrate is rectangular.

5. The optical filter device of claim 4, wherein the encasement is ring-shaped with a substantially rectangular opening configured so as to contact at least two opposing side surfaces of the transparent substrate.

6. The optical filter device of claim 4 wherein the encasement has a substantially rectangular opening configured so as to contact a first side surface of the transparent substrate and a second side surface of the substrate, the second side surface being opposite to the first side surface along a runoff direction.

7. The optical filter device of claim 1, wherein the first selected coefficient of thermal expansion is between about 0–10 ppm/° C. within the operating temperature range of the optical filter device.

8. The optical filter device of claim 1 wherein the first selected coefficient of thermal expansion is between about 0–5 ppm/° C. within the operating temperature range of the optical filter device.

9. The optical filter device of claim 1 wherein the first selected coefficient of thermal expansion is between about 0–3 ppm/° C. within the operating temperature range of the optical filter device.

10. The optical filter device of claim 1 wherein the first selected coefficient of thermal expansion is between about 5–10 ppm/° C. within the operating temperature range of the optical filter device.

11. The optical filter device of claim 1, wherein the first selected coefficient of thermal expansion is between about 8–12 ppm/° C. within the operating temperature range of the optical filter device.

12. The optical filter device of claim 1, wherein the second selected coefficient of thermal expansion is between about 10–24 ppm/° C. within the operating temperature range of the optical filter device.

13. The optical filter device of claim 1, wherein the second selected coefficient of thermal expansion is between about 0–10 ppm/° C. within the operating temperature range of the optical filter device.

14. The optical filter device of claim 1, wherein the second selected coefficient of thermal expansion is in the range from about 15–18 ppm/° C. within the operating temperature range of the optical filter device.

15. The optical filter device of claim 1, wherein the second selected coefficient of thermal expansion is greater than the first selected coefficient of thermal expansion.

16. The optical filter device of claim 1 wherein the second selected coefficient of thermal expansion is less than the first selected coefficient of thermal expansion.

17. An optical filter device comprising:
   an optical filter formed on a substrate, the substrate being composed of a first material having a first selected coefficient of thermal expansion;

an encasement surrounding the substrate such that the optical filter is exposed for transmission of predetermined optical wavelengths there through and a coated surface of the optical filter extends a selected distance beyond a surface of the encasement, the encasement being composed of a second material having a second selected coefficient of thermal expansion that is different than the first selected coefficient of thermal expansion wherein the encasement provides temperature-varying stress to the transparent substrate within an operating temperature range of the optical filter device.

18. The optical filter device of claim 17 wherein said selected distance extends a value greater than 0.0 mm and in the range between about 0–0.5 mm beyond the surface of the encasement.

19. An optical filter device comprising:
   an optical filter having a circular face formed on a cylindrical substrate having a first diameter, the substrate being made of a glass having a first coefficient of thermal expansion between about 5–10 ppm/° C.;
   an encasement made of an encasement material having a second coefficient of thermal expansion between about 15–18 ppm/° C., the substrate being disposed in a cylindrical through hole in the encasement, the encasement applying a first compressive stress to the substrate at a first operating temperature and a second compressive stress to the substrate at a second operating temperature, the first compressive stress being greater than the second compressive stress and the first operating temperature being less than the second operating temperature.

20. A method for assembling an optical filter device, comprising steps of:
   providing an optical filter on a substrate, the substrate composed of a first material having a first coefficient of thermal expansion; and
   fitting the optical filter to an opening of an encasement made of a second material having a second coefficient of thermal expansion different from the first coefficient of thermal expansion to apply a selected stress to the substrate in a plane essentially parallel to a face of the optical filter.

21. The method of claim 20 wherein the opening has an interior dimension less than a width of the substrate at a first operating temperature, and further comprising, prior to the fitting step, a step of
   heating the encasement to a temperature above the first operating temperature to enlarge the opening to a second interior dimension greater than the width of the substrate; and, after the fitting step,
   cooling the encasement to provide a first compressive stress to the substrate at the first operating temperature and a second compressive stress to the substrate at a second operating temperature.

22. The method of claim 20, wherein the substrate is fitted to the encasement at a temperature greater than about 100° C.

23. The method of claim 20 wherein the encasement has an opening with an interior dimension greater than the width of the substrate.

24. The method of claim 20, wherein the substrate is fitted to the encasement at a temperature less than about −20° C.

25. The method of claim 20 wherein the fitting step comprises
   heating the encasement, and
   forming the encasement to a zero clearance condition with the substrate.

26. The method of claim 25 wherein the forming comprises stamping or swaging.

27. The method of claim 20 further comprising steps, after the fitting step, of:

measuring an optical characteristic of the optical filter device; and
   altering the encasement to provide a second selected stress to the substrate to optically tune the optical filter device.

28. The method of claim 27 wherein the altering step includes stamping, swaging, or removing a selected amount of material from the encasement.

29. The method of claim 20 wherein the encasement is a memory metal and the fitting step comprises forming the opening at a first dimension less than a width of the substrate, expanding the opening to a second dimension greater than the width of the substrate, placing the substrate in the opening, and processing the encasement to shrink the opening around the substrate.

30. The method of claim 20 wherein the fitting step comprises melting an encasement material, applying the melted encasement material around a perimeter surface of the substrate, and cooling the encasement material though a solid transition temperature to an operating temperature.

31. The method of claim 20 further comprising a step, after the fitting step, of removing a selected amount of material from the encasement to apply a second selected stress to the substrate.

32. An optical filter device comprising:
   an encasement having an opening formed by an interior sidewall;
   a filter chip having a filter face essentially normal to the interior sidewall and an exterior sidewall extending essentially parallel to the interior sidewall disposed in the opening; and
   a bonding layer disposed between at least a portion of the interior sidewall and the exterior sidewall, the bonding layer being in intimate contact with the filter chip and conveying stress from the encasement to the filter chip in a plane of the filter face.

33. The optical filter device of claim 32 wherein the bonding layer is an adhesive, a thermoplastic resin, a thermosetting resin, solder, frit, or braze.

34. A method of thermally stabilizing an optical filter, the method comprising steps of:
   providing a first compressive stress from an encasement to an optical filter substrate in a plane of a filter face at a first temperature, the optical filter substrate being made of a substrate material having a first coefficient of thermal expansion and the encasement being made of an encasement material having a second coefficient of thermal;
   changing from the first temperature to a second temperature higher than the first temperature to expand the encasement more than the optical filter substrate in the plane of the filter face; and
   passively creating a second stress between the encasement to the optical filter substrate to enhance the expansion of the optical filter substrate in the plane of the filter face.

35. The method of claim 34 wherein the substrate material comprises glass having a coefficient of thermal expansion of about 5–10 ppm/° C.

36. The method of claim 34 wherein the substrate material comprises glass having a coefficient of thermal expansion of about 1–5 ppm/° C.

37. The method of claim 34 wherein the encasement material has a coefficient of thermal expansion between about 10–24 ppm/° C.

38. The method of claim 37 wherein the encasement material is a stainless steel.

* * * * *